| United States Patent [19] | [11] Patent Number: 4,738,788 |
|---|---|
| Aurenge | [45] Date of Patent: Apr. 19, 1988 |

[54] RHEOLOGICALLY STABLE AQUEOUS DRILLING FLUIDS

[75] Inventor: Jacques Aurenge, Saint-Didier-au-Mont-D'Or, France

[73] Assignee: Rhone-Poulenc Specialites Chimiques, Courbevoie, France

[21] Appl. No.: 862,694

[22] Filed: May 13, 1986

[30] Foreign Application Priority Data

May 13, 1985 [FR] France ................................. 85 07189

[51] Int. Cl.$^4$ ............................................... C09K 7/02
[52] U.S. Cl. ................................... 252/8.514; 252/8.51
[58] Field of Search ................. 252/8.51, 8.511, 8.513, 252/8.514

[56] References Cited

U.S. PATENT DOCUMENTS

| 2,552,775 | 5/1951 | Fischer et al. .................... 252/8.513 |
|---|---|---|
| 3,203,938 | 8/1965 | Baechtold .......................... 252/8.51 |
| 3,730,990 | 5/1973 | Perricone et al. ................ 252/8.513 |
| 3,761,410 | 9/1973 | Mondshine ........................ 252/8.51 |
| 4,048,077 | 9/1977 | Engelhardt et al. ............. 252/8.513 |
| 4,085,167 | 4/1978 | Lewis et al. . |
| 4,451,628 | 5/1984 | Dammann . |
| 4,554,307 | 11/1985 | Farrar et al. ................. 252/8.511 X |

*Primary Examiner*—Herbert B. Guynn
*Attorney, Agent, or Firm*—Burns, Doane, Swecker & Mathis

[57] ABSTRACT

Aqueous drilling muds which are rheologically stable, non-toxic and adopted for use at high temperatures, are comprised of a viscosity modifying material, e.g., a conventional clay, and a copolymeric dispersant therefor, said copolymeric dispersant comprising the water-soluble, low molecular weight copolymerizate of from about 75 to 99 molar % of acrylic or methacrylic acid, or admixture thereof, with from about 1 to 25 molar % of a water-soluble salt of allyl or methallylsulfonic acid, or admixture thereof.

11 Claims, No Drawings

RHEOLOGICALLY STABLE AQUEOUS DRILLING FLUIDS

BACKGROUND OF THE INVENTION

1. Field of the Invention

The present invention relates to the utilization of certain acrylic copolymers as dispersants for aqueous drilling muds, and, more especially, relates to novel drilling muds comprised of such acrylic copolymeric dispersants which are more particularly suitable for drilling at medium and great depths, in regions which are complicated by difficulties related to the temperature of the ground, to the substantial content of solids with which the mud may become charged over the course of the drilling operation and, finally, to environmental constraints in respect of toxicity.

2. Description of the Prior Art

It is known to the art that, when drilling natural gas or petroleum/oil wells via rotary process, a drilling fluid is used, the purpose of which is, in particular, to cause the excavated material or waste which is formed at the cutting edges to ascend in the well towards the surface. That fluid, which is introduced under pressure by way of the axis of the drill cord, passes through the head of the drill bit and then ascends through the annular space defined by the drill cord and the drill hole itself, at the same time performs other functions. notably those of cooling the head of the bit, rendering fluid-tight the walls of the well and balancing the internal pressures by means of hydrostatic pressure.

Aqueous drilling fluids or drilling muds typically comprise an aqueous suspension containing various materials which are intended to impart thereto certain physical and chemical properties.

In particular, they are as follows:

(i) viscosifying or viscosity modifying agents: water-insoluble swelling clays which are selected in dependence upon the proportion of electrolytes in the water, often associated with one or more viscosifying polymers;

(ii) a dispersant or thinning agent;

(iii) optionally, a fluid loss additive, such as carboxymethylcellulose or low molecular weight of starches;

(iv) optionally, a weight-providing agent, such as barytes.

The water may be soft water, sea water or a brine.

One of the principal problems which confronts this art is that of providing a system which has stable rheological characteristics (viscosity, yield value, thixotropy) throughout the entirety of the drilling cycle, and notwithstanding stop-pages in circulation which may be necessary. As the drilling operation progresses and the waste material ascends toward the surface, the high content of solid contaminants causes the increase in viscosity, and pressure in the circulatory system tends to become excessively high if aggregation and/or flocculation of the particles of clay occurs.

In order to reduce viscosity, or at least to limit the increase thereof and to deflocculate the clay, viscosity reducing agents (dispersants or thinning agents) are commonly added to the drilling fluid.

Relatively high temperatures may be encountered in petroleum wells as a result of the increase in the depth thereof. It is, therefore, essential for the additives to have adequate thermal stability. For obvious reasons of economy, it is desirable for them to be effective in small amounts.

Polyphosphates are not a very attractive alternative as drilling and dispersants, because of their instability at temperatures of higher than 70° C. Derivatives of lignite and lignosulfonates are less susceptible to thermal degradation. However, the effectiveness of lignite is limited by electrolyte contaminating species (sodium chloride and calcium salts in particular) which effect precipitation thereof. Chromium and ferrochrome lignosulfonates are used both as dispersants and fluid loss additives. They are effective in the presence of calcium salts and at temperatures of up to 150° C., but their toxicity due to the chromium content seriously and increasingly limits the use thereof.

Of the other dispersants which are recommended for drilling muds, exemplary are polymers such as homopolymers of acrylic acid, having very low molecular weight (U.S. Pat. No. 3,764,530) and copolymers of maleic acid and sulfonated styrene (U.S. Pat. No. 3,730,900).

SUMMARY OF THE INVENTION

Accordingly, a major object of the present invention is the provision of improved dispersants for use in drilling fluids/muds which satisfy those desiderata about outlined, i.e., they are non-toxic, insensitive to a saline environment, highly effective, even at low levels of concentration, and are markedly stable at temperatures of up to and even exceeding 150° C.

Briefly, the present invention features the use, as dispersants in aqueous drilling muds, of water-soluble acrylic copolymers of low molecular weight, resulting from the copolymerization of from 75 to 99 molar % of acrylic and/or methacrylic acid with from 1 to 25 molar % of a water-soluble salt of allyl and/or methallyl sulfonic acid.

DETAILED DESCRIPTION OF THE PREFERRED EMBODIMENTS OF THE INVENTION

More particularly according to the present invention, the subject copolymerizates may be produced by radical polymerization, in aqueous solution, of acrylic and/or methacrylic acid with an alkali metal allyl and/or methallyl sulfonate, advantageously the sodium or ammonium salt. It is possible, for example, to use hydrogen peroxide as a catalyst for the formation of free radicals, in association with isopropyl alcohol in the presence of small amounts of copper salt, which latter may be replaced by a given amount of hydroxylamine sulfate or hydrogen peroxide with a salt of iron (ferrous sulfate) and hydroxylamine sulfate, or sodium or ammonium persulfate in the presence of acetic acid.

The resulting solution of the polymerizate may be used, as such, as a dispersant for drilling muds, but it may also be concentrated using any known means, or else the copolymer may be isolated in the form of a powder.

In a preferred embodiment of the present invention, a copolymer is used produced from a mixture of monomers containing both acrylic acid and methacrylic acid. The molar ratio of the acrylic acid to the methacrylic acid preferably ranges from 0.15/1 to 6/1, more preferably from 0.3/1 to 4/1 and even more preferably from 1/1 to 2/1.

The copolymer produced has a molecular weight typically ranging from about 500 to 10,000 and advantageously from about 2,000 to 6,000.

The dispersant is added to the other constituents of the mud, in per se known manner. It is effective in an amount which is as low as 0.01 g (dry extract) per liter of mud. Amounts ranging from 0.05 to 1 g of dispersant per liter of mud are typically incorporated, although larger amounts, for example up to 10 g, may be used, depending upon the particular circumstances. The preferred amounts range from 0.1 to 0.4 g/liter.

In order to further illustrate the present invention and the advantages thereof, the following specific Examples are given, it being understood that same are intended only as illustrative and in nowise limitative.

EXAMPLE 1

Preparation of the dispersant

The following two solutions were prepared:
Solution A:
(i) Demineralized water: 350 g
(ii) Copper acetate: 0.5 g
(iii) Sodium methallylsulfonate: 5 g
(iv) Isopropanol: 50 g
Solution B:
(i) Demineralized water: 450 g
(ii) Acrylic acid: 230 g
(iii) Methacrylic acid: 230 g
(iv) Sodium methallylsulfonate: 50 g Using a 2 liter reaction vessel provided with an agitator, and three tubes for introducing nitrogen, monomers and catalyst, the solution A was placed under a nitrogen atmosphere. The deaerated and agitated medium was heated under reflux, and then 100 g of solution B and 12 ml of hydrogen peroxide at a value of 110 volumes were introduced. The solution was maintained under reflux and under agitation and then the remaining 860 g of solution B and 68 ml of hydrogen peroxide were introduced continuously and simultaneously. That addition operation continued for 1 hour, 30 minutes. 10 ml of hydrogen peroxide were further added; the solution was maintained under reflux for 30 minutes, then a fresh amount of 10 ml of hydrogen peroxide was added, and the solution was maintained under reflux for 1 hour, 30 minutes.

The solution was concentrated by distillation under vacuum and then cooled.

The concentrate had a dry extract content of 49.5% and a specific gravity of 1.185. Brookfield viscosity was 1,300 mPa.s (model RV - needel No. 2).

Mean molecular weight of the polymer, Mw, waas 4,000.

Hydrodynamic diameter of the particles by diffusion of light in 5.1 g/l solution, $\phi=45$ Angstroms.

Preparation of the drilling mud

A mud was prepared using soft water and bentonitic clays by introducing, into 8.9 liters of water, 410 g of bentonite FB5 and 600 g of bentonite FR2 (commercial products marketed by CECA), having a yield, respectively, of 35 m$^3$ and 15 m$^3$ of mud per ton of clay used, with the definition of the yield being in accordance with specification No. DFCP 4 "Drilling Fluid Material Bentonite" of OCMA (Oil Companies Materials Association).

The pH was adjusted to 9.5 by the addition of soda. Agitation was carried out for 3 minutes by means of an ULTRATURRAX turbine rotating at 15,000 rpm, and the mud was permitted to cool at 25° C.

The mud was separated into a number of aliquot fractions.

The dispersant was added to each fraction, in varying amounts, as set forth in Table 1. Shearing was again carried out for 30 seconds using the turbine. The mud was permitted to stand at rest for 30 minutes and the rheological characteristics were determined by means of a FANN viscosimeter model 35A, at a temperature of 25° C.

Measurements were taken in respect of apparent viscosity (Va), plastic viscosity (Vp), yield value (Yv) and the value of the initial gel and the gel after 10 minutes (gel 0/10). Those characteristics are defined in the text "Drilling and Drilling Fluids", G. V. Chilingarian and P. Vorabutr, Elsevier (1981).

By way of comparison, measurements were made in respect of the performances of a ferrochrome lignosulfonate in accordance with the prior art (trademark Brixel from CECA).

All of the results obtained are reported in Table 1 which follows.

It will be appreciated that the mud containing the dispersant according to the invention had a rheological performance which was much superior to that of the mud to which ferrochrome lignosulfonate was added, since the values in respect of viscosity and gel, which reflect thickening of the mud, were much lower.

EXAMPLE 2

Using the mud prepared according to the procedure of Example 1, the dispersants were tested at high temperature.

Each mud, after the addition of the dispersant at the selected level of concentration (Table 2), was introduced into a cell and subjected to a rolling operation in a rotary oven for a period of 16 hours at temperatures of 90° C., 120° C. or 150° C.

The results of the rheological measurements made after the thermal test are reported in Table 2 which follows.

It will be noted that the dispersant according to the invention remained effective at high temperature and had a much higher level of performance than ferrochrome lignosulfonate.

Thus, for a concentration of 2 g per liter of mud, comparison of the value YV before rolling and after rolling at different temperatures evidences that the mean YV is 3.5 for the composition according to the invention with 49.5% of dry extract, whereas it is 30 for lignosulfonate with 100% of dry extract.

EXAMPLES 3 to 10

Following the procedure of Example 1, copolymers were prepared, with the amount of sulfonate units varying and with the molar ratio between the acrylic acid and methacrylic acid being maintained constant.

Each polymer was introduced into the mud formulation of Example 1, in an amount of 0.1 g (dry extract) per liter of mud. Measurements were made in respect of the initial rheological properties, after shearing, and after standing at rest for 30 minutes.

The amount of monomers used, expressed in terms of moles, the composition of the terpolymer (acrylic acid/methacrylic acid molar ratio, mumber of mole % of sulfonate) as well as the results of the measurements made are reported in Table 3 which follows.

EXAMPLES 11 to 16

Additives were prepared in the manner described in Example 1, with variations in the molar ratio between the acrylic acid and methacrylic acid. The composition of the terpolymer and the results of the initial rheological measurements in respect of the mud (0.1 g of dispersant/liter) are reported in Table 4 which follows.

EXAMPLES 17 to 23

In these Examples, the dispersant was prepared by using either acrylic acid or methacrylic acid. The copolymer obtained was evaluated as in the preceding Examples. The compositions and results of the measurements are reported in Table 5 which follows.

TABLE 1

| Operating Conditions | Dispersant, g/liter of mud* | Brixel | | | | Copolymer according to the invention | | | |
|---|---|---|---|---|---|---|---|---|---|
| | | Va mPa.s | Vp mPa.s | YV[a] | Gel 0/10 | Va mPa.s | Vp mPa.s | YV[a] | Gel 0/10 |
| Before rolling | 0.5 | | | | | 9 | 6 | 6 | 2/8 |
| | 1 | 25 | 4 | 42 | 37/63 | 9 | 7 | 4 | 2/10 |
| | 2 | 22.5 | 15 | 15 | 30/60 | 6.5 | 5 | 3 | 1/2 |
| | 4 | 20 | 11 | 20 | 18/38 | 6 | 5 | 2 | 1/2 |
| | 6 | 19 | 7 | 24 | 19/42 | 6 | 6 | 0 | 1/1 |
| | 8 | 18 | 10 | 16 | 9/25 | 7 | 7 | 0 | 1/1 |

*Dry extract : Brixel 100% Copolymer 49.5%
[a]lb./100 ft² 1 lb./100 ft² = 0.478 Pa

TABLE 2

| Operating Conditions | Dispersant, g/liter of mud* | Brixel | | | | Invention | | | |
|---|---|---|---|---|---|---|---|---|---|
| | | Va mPa·s | Vp mPa·s | YV[a] | Gel 0/10 | Va mPa·s | Vp mPa·s | YV[a] | Gel 0/10 |
| After rolling for 16 hours at 90° C. | 0.5 | | | | | 30 | 22 | 16 | 4/22 |
| | 1 | 35 | 14 | 42 | 30/52 | 20.5 | 16 | 9 | 2/10 |
| | 2 | 37 | 18 | 36 | 26/45 | 15.5 | 13 | 5 | 2/3 |
| | 4 | 35 | 25 | 20 | 14/26 | 18.5 | 16 | 5 | 1/2 |
| | 6 | 29 | 20 | 18 | 9/21 | 17 | 14 | 6 | 2/9 |
| | 8 | 22 | 15 | 14 | 8/20 | 17 | 14 | 6 | 2/10 |
| After rolling for 16 hours at 120° C. | 1 | 34 | 13 | 42 | 35/38 | 21 | 18 | 6 | 0/12 |
| | 2 | 32 | 16 | 32 | 24/42 | 10 | 9 | 2 | 0/0 |
| | 4 | 30 | 19 | 22 | 18/28 | 9 | 8 | 2 | 0/0 |
| After rolling for 16 hours at 150° C. | 2 | 34 | 15 | 38 | 32/50 | 15 | 13 | 4 | 0/1 |

*Dry extract: Brixel 100% Copolymer 49.5%
[a]lb./100 ft² 1 lb./100 ft² = 0.478 Pa

TABLE 3

| Ex. | Composition of the Dispersant | | | | | | Rheology | | | |
|---|---|---|---|---|---|---|---|---|---|---|
| | AA[a] moles | MAA[a] moles | A—SO₃Na[a] moles | MA—SO₃Na[a] moles | AA/MAA[a] | —SO₃Na % | Va mPa·s | Vp mPa·s | YV[b] | Gel[b] 0/10 |
| 3 | 3.19 | 2.67 | — | 0.095 | 1.19 | 1.6 | 24.5 | 6 | 37 | 35/75 |
| 4 | 3.19 | 2.67 | — | 0.19 | 1.19 | 3.1 | 14 | 6 | 16 | 14/48 |
| 5 | 3.19 | 2.67 | — | 0.348 | 1.19 | 5.61 | 16.5 | 6 | 21 | 19/50 |
| 6 | 3.19 | 2.67 | 0.382 | — | 1.19 | 6.12 | 15.5 | 7 | 17 | 19/50 |
| 7 | 2.14 | 1.79 | — | 1.31 | 1.195 | 25 | 26 | 6 | 40 | 53/92 |
| 8 | 2.14 | 1.79 | 1.30 | — | 1.195 | 24.8 | 19.5 | 4 | 31 | 32/64 |
| 9[c] | 0.83 | 0.70 | — | 2.21 | 1.19 | 59 | cannot be measured | | | very high values |
| 10[c] | 0.83 | 0.70 | 2.29 | — | 1.19 | 60 | cannot be measured | | | |

[a]AA: acrylic acid
MAA: methacrylic acid
A—SO₃Na: sodium allylsulfonate
MA—SO₃Na: sodium methallylsulfonate
AA/MAA: acrylic acid/methacrylic acid molar ratio
—SO₃Na: moles of sulfonate units in the polymer
[b]lb./100 ft² 1 lb./100 ft² = 0.478 Pa
[c]outside the scope of the invention

TABLE 4

| Ex. | Composition of the Dispersant | | | | | | Rheology | | | |
|---|---|---|---|---|---|---|---|---|---|---|
| | AA[a] moles | MAA[a] moles | A—SO₃Na[a] moles | MA—SO₃Na[a] moles | AA/MAA[a] | —SO₃Na % | Va mPa.s | Vp mPa.s | YV[b] | Gel[b] 0/10 |
| 11 | 0.79 | 4.57 | — | 0.318 | 0.17 | 5.6 | 29 | 10 | 38 | 45/85 |
| 12 | 1.38 | 3.84 | 0.312 | — | 0.35 | 5.6 | 15.5 | 5 | 20.5 | 18/50 |
| 13 | 2.125 | 3.56 | — | 0.348 | 0.597 | 5.77 | 16 | 6 | 20 | 20/58 |
| 14 | 4.25 | 1.78 | — | 0.348 | 2.39 | 5.45 | 18.5 | 8 | 21 | 20/61 |
| 15 | 4.58 | 1.16 | 0.347 | — | 3.95 | 5.7 | 17.5 | 7 | 21 | 13/53 |

TABLE 4-continued

| | Composition of the Dispersant | | | | | | Rheology | | | |
|---|---|---|---|---|---|---|---|---|---|---|
| Ex. | AA[a] moles | MAA[a] moles | A—SO$_3$Na[a] moles | MA—SO$_3$Na[a] moles | AA/MAA[a] | —SO$_3$Na % | Va mPa.s | Vp mPa.s | YV[b] | Gel[b] 0/10 |
| 16 | 5.21 | 0.87 | — | 0.38 | 6 | 5.9 | 23.5 | 6 | 35 | 34/75 |

[a]AA: acrylic acid
MAA: methacrylic acid
A—SO$_3$Na: sodium allylsulfonate
MA—SO$_3$Na: sodium methallylsulfonate
AA/MAA: acrylic acid/methacrylic acid molar ratio
—SO$_3$Na: moles of sulfonate units in the polymer
[b]lb./100 ft$^2$ 1 lb./100 ft$^2$ = 0.478 Pa

TABLE 5

| | Composition of the Dispersant | | | | | Rheology | | | |
|---|---|---|---|---|---|---|---|---|---|
| Ex. | AA[a] moles | MAA[a] moles | A—SO$_3$Na[a] moles | MA—SO$_3$Na[a] moles | —SO$_3$Na[a] % | Va mPa.s | Vp mPa.s | YV[b] | Gel[b] 0/10 |
| 17 | — | 5.35 | — | 0.348 | 6.12 | 20 | 5 | 30 | 38/70 |
| 18 | 6.39 | — | — | 0.475 | 6.92 | 26 | 7 | 38 | 50/80 |
| 19 | — | 5.23 | 0.347 | — | 6.2 | 19 | 5 | 28 | 32/55 |
| 20 | 4.29 | — | — | 1.43 | 25 | 25 | 3 | 44 | 52/84 |
| 21 | — | 3.37 | — | 1.13 | 25 | 26.5 | 3 | 47 | 50/80 |
| 22[c] | 3.19 | — | — | 1.71 | 34.9 | 30 | 2 | 56 | 58/95 |
| 23[c] | — | 3.02 | — | 1.61 | 34.7 | 30 | 2 | 56 | 62/100 |

[a]AA: acrylic acid
MAA: methacrylic acid
A—SO$_3$Na: sodium allylsulfonate
MA—SO$_3$Na: sodium methallylsulfonate
—SO$_3$Na: moles of sulfonate units in the polymer
[b]lb./100 ft$^2$ 1 lb./100 ft$^2$ = 0.478 Pa
[c]outside the scope of the invention While the invention has been described in terms of various preferred embodiments, the skilled artisan will appreciate that various modifications, substitutions, omissions, and changes may be made without departing from the spirit of thereof. Accordingly, it is intended that the scope of the present invention be limited solely by the scope of the following claims, including equivalents thereof.

What is claimed is:

1. An essentially rheologically stable aqueous drilling fluid adapted for use at elevated temperatures, which comprises an aqueous suspension of a viscosifying material and, as a dispersant, a water-soluble copolymer prepared by copolymerizing a mixture comprising from about 75 to about 99 mole % of an admixture of acrylic and methacrylic acid and from about 1 to about 25 mole % of a water soluble salt of allyl or methallylsulfonic acid;
   wherein said copolymer has a molecular weight of from about 500 to about 10,000, and wherein the molar ratio of acrylic acid to methacrylic acid is from about 0.3/1 to about 4/1.

2. The aqueous drilling fluid as defined by claim 1, said molar ratio ranging from about 1/1 to about 2/1.

3. The aqueous drilling fluid as defined by claim 1, said water-soluble salt of said sulfonic acid comprising an alkali metal or ammonium salt.

4. The aqueous drilling fluid as defined by claim 1, comprising from about 0.01 to 10 g of said dispersant per liter thereof.

5. The aqueous drilling fluid as defined by claim 1, said viscosity modifying material comprising a water-insoluble, water-swellable clay.

6. The aqueous drilling fluid as defined by claim 1, further comprising a carboxymethylcellulose or starch additive.

7. The aqueous drilling fluid as defined by claim 1, further comprising a baryte.

8. The aqueous drilling fluid as defined by claim 1, said copolymerizate having a molecular weight ranging from about 2,000 to about 6,000.

9. The aqueous drilling fluid as defined by claim 1, wherein the amount of said water soluble salt in said copolymer is between about 1 and about 6.12 mole %.

10. The aqueous drilling fluud as defined by claim 1, wherein the amount of said water soluble salt in said copolymer is between about 3.1 and about 6.12 mole %.

11. In a well bore drilling operation utilizing an aqueous drilling mud, the improvement which comprises utilizing, as the drilling mud therefor, the aqueous drilling fluid as defined by claim 1.

* * * * *